United States Patent [19]

Kohzuma

[11] Patent Number: 4,457,137
[45] Date of Patent: Jul. 3, 1984

[54] AIRCONDITIONER WITH TIMER CONTROLLED COMPRESSOR BYPASS

[75] Inventor: Chikashi Kohzuma, Shizuoka, Japan

[73] Assignee: Mitsubishi Denki Kabushiki Kaisha, Tokyo, Japan

[21] Appl. No.: 370,549

[22] Filed: Apr. 21, 1982

[30] Foreign Application Priority Data

Apr. 23, 1981 [JP] Japan .................................. 56-61630

[51] Int. Cl.³ ........................ G05D 23/32; F25B 13/00
[52] U.S. Cl. ....................................... 62/158; 62/160; 62/196.3; 165/29
[58] Field of Search .................. 62/160, 196 R, 196 A, 62/196 C, 158, 324.6, 160, 196.1, 196.2, 196.3, 158, 324.6, 231, 157; 165/29

[56] References Cited

U.S. PATENT DOCUMENTS

| | | | |
|---|---|---|---|
| 1,786,791 | 12/1930 | Terry | 62/196 C |
| 1,894,285 | 1/1933 | Swezey | 62/196 C |
| 3,563,304 | 1/1969 | McGrath | 165/2 |
| 3,777,508 | 12/1973 | Imabayashi et al. | 62/324 |
| 4,137,726 | 2/1979 | Watada | 62/324.6 X |

*Primary Examiner*—Albert J. Makay
*Assistant Examiner*—Harry Tanner
*Attorney, Agent, or Firm*—Wenderoth, Lind & Ponack

[57] ABSTRACT

An airconditioner wherein cooling is performed by forming a refrigerant circulation passage which condenses a refrigerant delivered from a compressor by means of an outdoor heat exchanger and which evaporates it by means of an indoor heat exchanger, while warming is performed while condensing the refrigerant by means of the indoor heat exchanger by furnishing the refrigerant circulation passage with a heating heat exchanger which heats the refrigerant through a heat medium higher in temperature than the open air and which is located in parallel with the outdoor heat exchanger and between the indoor heat exchanger and the suction side of the compressor; characterized by comprising a circuit which bypasses the higher pressure side and lower pressure side of the compressor through a solenoid valve, and a controller which normally closes the bypass circuit during the cooling and normally opens the bypass circuit during the warming and which opens the bypass circuit for a predetermined period of time at the starting of the cooling.

6 Claims, 2 Drawing Figures

AIRCONDITIONER WITH TIMER CONTROLLED COMPRESSOR BYPASS

BACKGROUND OF THE INVENTION

1. Field of the Invention

The present invention relates to a heat pump type airconditioner in which a heat source in a warming mode is a heater.

2. Description of the Prior Art

In general, heat pump type airconditioners employing an air ambient heat source have numerous merits e.g. that they are safe, the energy utilization efficiency is high and cooling and warming can be performed with an identical machine. This system, however, involves such essential disadvantages that when the temperature of the outdoor air falls, the warming capability deteriorates to a point such that the desired warming is impossible, and that various troubles attributed to frost on the parts of the apparatus occur. Airconditioners in which a combustor for kerosene, town gas or the like is incorporated in the unit with a cooling device are free from the disadvantages of the aforementioned heat pump type apparatus employing an ambient air heat source, but they have the disadvantage that the initial cost is high.

As a cooling and warming apparatus making the best use of the features of both the types of airconditioners, there has recently been proposed a system in which, in a cooling mode, a refrigerant is circulated in order through a compressor—an outdoor heat exchanger—a pressure reducing device—an indoor heat exchanger—and the compressor so as to perform cooling, while in a warming mode, the refrigerant is circulated in order through the compressor—the indoor heat exchanger—an outdoor side heater provided with a heating mechanism—and the compressor so as to perform warming (as, for example, U.S. patent application Ser. No. 362,838 filed Mar. 29, 1982 in the name of Tamotsu Nomaguchi et al, corresponding to Japanese Patent Application No. 55-137408, by Mitsubishi Denki Kabushiki Kaisha.)

FIG. 1 shows a prior-art refrigeration circuit in a heat pump type airconditioner provided with a refrigerant heating mechanism. In the cooling mode, a refrigerant delivered from a compressor 1 is led by a four-way transfer valve 2 to an outdoor heat exchanger 3 where the refrigerant is condensed. After passing through a check valve 5, the liquid refrigerant has its pressure reduced by a throttle mechanism 7, and it is evaporated by an indoor heat exchanger 9 so as to cool a room. The flow of the refrigerant is controlled by the four-way transfer valve 2 again so as to bring the refrigerant back to the compressor 1.

In the warming mode, the refrigerant circulation circuit is changed-over by the four-way transfer valve 2 as follows. First, the refrigerant at a high temperature is condensed by the indoor heat exchanger 9, giving up heat to the room, and the liquid refrigerant is passed through a check valve 8 of a bypass circuit which is connected in parallel with the throttle mechanism 7. Then the refrigerant is circulated through a check valve 6 to a refrigerant heating heat exchanger 4, being blocked by the action of the check valve 5 disposed on the downstream side of the outdoor heat exchanger 3. After the refrigerant is heated and evaporated in the heat exchanger 4, it passes through the four-way valve and returns to the compressor again.

In addition, there is provided a compressor a bypass circuit 10 which is provided with a solenoid valve 11 and which connects the delivery side and suction side of the compressor 1. The bypass circuit 10 functions as follows. In the cooling mode, the solenoid is kept closed in the normal cooling mode operation, i.e. when the cooling load is normal. However, when the cooling load is small, the valve 11 is opened to divert refrigerant from the main circuit so that energy-conserving airconditioning can be carried out during which the cooling capability is kept low and so that the electric power input to the compressor can be reduced. In the normal warming mode, i.e. a normal heating load, specifically at the beginning thereof, the valve 11 is kept open until the circulation state or circulation rate, the temperature, etc. of the refrigerant which is heated by the refrigerant heating heat exchanger employing a combustor of town gas, kerosene or the like reaches a predetermined stable state. In another aspect of use, for the same purpose as in the cooling mode, when the warming load is small, the valve 11 is opened, and the thermal input to the refrigerant heating mechanism is simultaneously reduced, whereby the warming capability is adjusted.

However, when employing an external heat source such as a burner which is at a temperature higher than that of the ambient air, heat is radiated into the lower temperature ambient air by the heat exchanger in the above-described prior-art system, and the heating efficiency deteriorates. Therefore, a method has been considered in which, in the warming mode, the heat exchanger in the prior art apparatus is filled up with the refrigerant in its liquid phase so as to reduce the heat radiation to the utmost. With this method, however, the quantity of the refrigerant within the circuit becomes too large, resulting in the disadvantage that in the cooling mode the compressor is difficult to start when beginning the cooling mode.

SUMMARY OF THE INVENTION

The present invention has been made in order to eliminate the above-stated disadvantages, and consists in causing part of a compressed refrigerant to flow from the delivery side of a compressor to the suction side thereof.

DETAILED DESCRIPTION OF THE PREFERRED EMBODIMENTS

Figure 1:
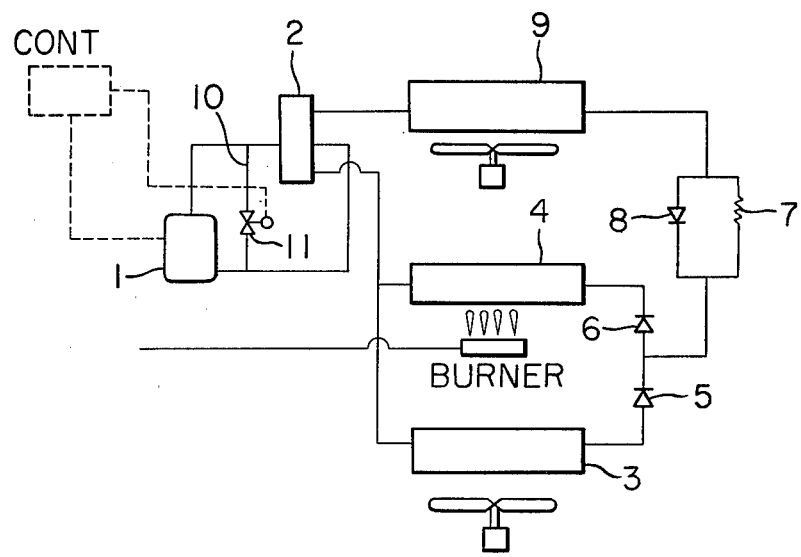
FIG. 1 is a diagram of a refrigeration circuit in a prior-art, heat pump type airconditioner provided with a refrigerant heating mechanism.
Figure 2:
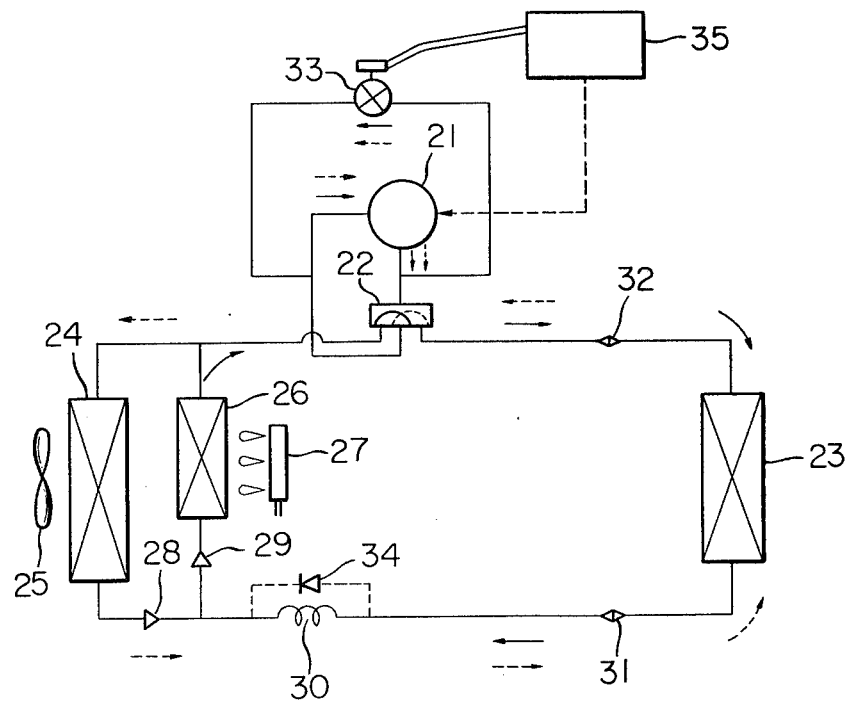
FIG. 2 is a diagram of a refrigerant circuit in an air conditioner embodying the present invention.

An embodiment of the present invention will now be described. FIG. 2 is a refrigerant flow diagram showing the arrangement of the embodiment.

In the figure, numeral 21 designates a compressor, numeral 22 a four-way valve, numeral 23 an indoor heat exchanger, numeral 24 an outdoor heat exchanger which exchanges heat with the operating at a higher air by means of a fan 25, and numeral 26 a heating heat exchanger which exchanges heat with a heat source, such as a burner 27, operating at a higher temperature than the ambient outdoor air.

Numerals 28 and 29 indicate check valves which are arranged in series with the outdoor heat exchanger 24 and the heating heat exchanger 26 and which cut off flows reverse to the senses of the arrowheads, respectively. Numeral 30 indicates a throttling capillary tube which is connected at one end with the indoor heat exchanger 23 through a first coupling 31. Numeral 34 indicates a check valve which is connected in parallel with the capillary tube 30 and which enables refrigerant to bypass the capillary tube 30 during operation in the warming mode. Numeral 32 indicates a second coupling which is interposed between the indoor heat exchanger 23 and the four-way valve 22. Further, numeral 33 indicates a solenoid valve which is disposed midway of a compressor bypass pipe that brings the delivery side and suction side of the compressor 21 into direct communication, and which can control flow in the direction of the arrow. Numeral 35 indicates a controller which is connected to the solenoid valve 33 and the compressor 21 and in which an operation switch for the compressor 21 and a timer (not shown) are contained.

Now, the operations of the airconditioner of the present invention constructed as described above will be explained.

First, in the cooling mode, a refrigerant flows as indicated by broken line arrows under the action of the four-way valve 22, and it cools a room or rooms by radiating heat into the ambient outdoor air while being condensed within the outdoor heat exchanger 24 and by absorbing heat while being evaporated within the indoor heat exchanger 23.

During normal cooling mode operation, i.e. when the apparatus is handling a normal cooling load, the solenoid valve 33 is usually closed. This valve is usually opened during a warming operation. The reason is as follows. In the warming operation, the temperature of the heat source 27 is high, so that the pressure in the refrigerating circuit increases and the refrigerant delivery rate of the compressor 21 increases so as to be in excess of the rate during the cooling mode. Therefore, part of the delivered refrigerant is bypassed by the solenoid valve 33 to the suction side of the compressor 21 from the delivery side thereof.

Further, in the warming mode, part of the refrigerant evaporated within the heating heat exchanger 26 is condensed by exchanging heat with the ambient outdoor air in the outdoor heat exchanger 24, so that the warming capability is reduced. In order to prevent this, the circuit is overfilled with the refrigerant to the extent that all the refrigerant contained in the outdoor heat exchanger 24 is in its liquid phase. In such a state, the condensation no longer takes place and the heat radiation is suppressed. However, because the quantity of the refrigerant required to maintain this state is large, liquid compression develops especially at the beginning of the operation of the compressor 21, and the electric motor (not shown) of the compressor 21 is subjected to an excess load and becomes incapable of starting in some cases. This phenomenon is also influenced by the difference between the delivery side pressure of the compressor 21 (higher pressure) and the suction side pressure thereof (lower pressure), and it is obvious that the starting is more difficult the greater the difference. Accordingly, the phenomenon is more liable to occur during the cooling mode in which the solenoid valve 33 is usually closed, than in the beginning of the warming mode during which the solenoid valve 33 is open.

In order to prevent this drawback, the present invention adopts the following measure. Even during the cooling mode, at the beginning of the cooling in which it is supposed that a large amount of liquid will return to the compressor 21, the solenoid valve 33 is kept open for a predetermined time, for example 1 to 2 minutes, by the use of the timer. When the distribution of the refrigerant in the refrigerant circuit has been stabilized to the extent that the liquid return no longer takes place, the solenoid valve 33 is closed. This can be a time up to 10 minutes.

According to the above apparatus, the difference between the pressures of the high pressure side and the low pressure side becomes small at the beginning of the cooling mode, and the motor of the compressor 21 can start even when the return of refrigerant liquid to the compressor has occurred.

Secondly, in the warming mode, the refrigerant flows as indicated by the solid line arrows under the action of the four-way valve 22, and it warms the indoors by absorbing heat while being evaporated within the heating heat exchanger 26 by means of the burner 27 and by radiating heat while being condensed within the indoor heat exchanger 23.

According to the present invention, the deterioration of the warming capability is avoided by increasing the quantity of the refrigerant filling the circuit, and the starting characteristic during the cooling mode can be improved inexpensively by utilizing the solenoid valve for the bypass between the delivery and suction sides of the compressor as is required in the warming mode. The effects of the invention are great.

What is claimed is:

1. A heat pump type airconditioner comprising: refrigerant compression means; a first heat exchanger disposed indoors and which functions as an evaporator during a cooling mode of operation and as a condenser during a warming mode of operation; a second heat exchanger disposed outdoors and which functions as a condenser during the cooling mode of operation; a third heat exchanger for heating the refrigerant during the warming mode of operation to increase the temperature thereof to a temperature higher than the outdoor air; heating means operatively associated with said third heat exchanger for providing heat to the third heat exchanger; said compression means and heat exchangers being connected in a refrigeration circuit for operating in the cooling mode and the warming mode when refrigerant is circulated therethrough in the proper direction, said refrigeration circuit having sufficient refrigerant therein for the second heat exchanger to be filled with liquid refrigerant when the airconditioner is operating in the warming mode and said third exchanger is being supplied with heat from said heating means; a compression means bypass pipe connected between the higher pressure side and the lower pressure side of said compression means; valve means connected in said bypass pipe for controlling the flow of refrigerant through said bypass pipe; and control means connected to said valve means for closing said valve means during normal cooling mode operation and having timing means as a part thereof for keeping said valve means open for a fixed predetermined length of time at the start of said compression means during the cooling mode of operation for keeping said bypass pipe open for said predetermined length of time.

2. An airconditioner according to claim 1 wherein said predetermined period of time is a period of time during which the refrigerant reaches a stable state of circulation through said refrigeration circuit.

3. An airconditioner according to claim 2 wherein said period of time is up to approximately 10 minutes.

4. An airconditioner as claimed in claim 1 wherein said valve means is a solenoid valve.

5. An airconditioner as claimed in claim 1 wherein said compression means is an electrically driven compressor, and said bypass pipe is connected between the output pipe and the suction pipe of said compressor.

6. An airconditioner as claimed in claim 1 further comprising a four-way changeover valve connected between the output side of said compression means and said refrigeration circuit for being changed over for circulating the refrigerant through the refrigeration circuit in the desired direction.

* * * * *